(12) United States Patent
Chen

(10) Patent No.: US 7,721,632 B2
(45) Date of Patent: May 25, 2010

(54) POWER TOOL MACHINE WITH A HOLDING APPARATUS

(75) Inventor: Jung-Huo Chen, Taichung (TW)

(73) Assignee: Rexon Industrial Corp., Ltd., Taichung (TW)

( * ) Notice: Subject to any disclaimer, the term of this patent is extended or adjusted under 35 U.S.C. 154(b) by 257 days.

(21) Appl. No.: 11/680,018

(22) Filed: Feb. 28, 2007

(65) Prior Publication Data
US 2007/0209493 A1    Sep. 13, 2007

(30) Foreign Application Priority Data
Mar. 10, 2006    (TW)    .............................. 95108212 A

(51) Int. Cl.
B26D 7/02        (2006.01)
B26D 7/04        (2006.01)
B23Q 3/02        (2006.01)
B25B 1/02        (2006.01)
B25B 5/02        (2006.01)

(52) U.S. Cl. .............................. 83/452; 83/453; 83/454; 83/455; 83/456; 83/466; 269/91; 269/94; 269/164

(58) Field of Classification Search ........... 83/452–456, 83/463–466, 451, 477.2, 471.3, 581, 468.2, 83/468.3, 467.1, 471, 490; 269/91–94, 203, 269/207, 259–261, 283–294, 164
See application file for complete search history.

(56) References Cited

U.S. PATENT DOCUMENTS

| 1,175,811 | A | * | 3/1916 | Ray | ............................ 269/91 |
| 2,430,900 | A | * | 11/1947 | Wetzler | ........................ 269/94 |
| 3,107,910 | A | * | 10/1963 | Wiemken | ..................... 269/211 |
| 4,283,977 | A | | 8/1981 | Batson | |
| 4,367,668 | A | * | 1/1983 | Jensen | .......................... 83/415 |
| 4,867,427 | A | * | 9/1989 | Cunningham | ................ 269/88 |
| 5,730,434 | A | | 3/1998 | Schoene et al. | |
| 5,836,574 | A | * | 11/1998 | Park | ............................ 269/93 |
| 5,913,509 | A | | 6/1999 | Price et al. | |
| 6,024,350 | A | | 2/2000 | Price et al. | |
| 6,139,000 | A | | 10/2000 | Price et al. | |
| 6,402,130 | B1 | | 6/2002 | Price et al. | |
| 6,543,323 | B2 | | 4/2003 | Hayashizaki et al. | |
| 2004/0173065 | A1 | | 9/2004 | Hill | |
| 2005/0082729 | A1 | * | 4/2005 | Wong | .......................... 269/91 |

FOREIGN PATENT DOCUMENTS

EP    0 685 284 A1    12/1996
JP    H10-138040    5/1998

* cited by examiner

*Primary Examiner*—Ghassem Alie
*Assistant Examiner*—Bharat C Patel
(74) *Attorney, Agent, or Firm*—Bacon & Thomas, PLLC

(57) ABSTRACT

A power tool machine includes a base, a fence, a cutting arm, a motor, a saw blade and a holding apparatus. The base has an operating surface for supporting a workpiece. The fence mounted on the operating surface has a standing surface substantially perpendicular to the operating surface for abutted by a side of the workpiece. The cutting arm pivotally coupled to the base. The saw blade mounted to the cutting arm is rotatable by the motor. The holding apparatus includes a supporting device mounted on the base, a connecting device including a body connected to the supporting device, wherein a length direction of the connecting device is substantially perpendicular to a length direction of the supporting device, an adjustable device pivotally coupled to the connecting device, and a pressing device connected to the adjustable device for selectively pressing another side of the workpiece.

5 Claims, 9 Drawing Sheets

POWER TOOL MACHINE WITH A HOLDING APPARATUS

RELATED APPLICATIONS

The present application is based on, and claims priority from, Taiwan Application Serial Number 95108212, filed Mar. 10, 2006, the disclosure of which is hereby incorporated by reference herein in its entirety.

BACKGROUND

1. Field of the Invention

The present invention relates to a power tool machine. More particularly, the present invention relates to a power tool machine with a holding apparatus for securing a workpiece in position on the power tool machine.

2. Description of Related Art

With reference to FIG. 1, a power tool machine 100 such as a miter saw in accordance with prior art includes a base 110, a fence 120, a cutting arm 130, a motor 140, a saw blade 150, a holding apparatus 160 and a setscrew 1621. The base 110 provides an operating surface 111 on which the fence 120 is mounted. The fence 120 provides a standing surface 121 that is perpendicular to the operating surface 111. A workpiece put on the operating surface 111 can be abutted against the standing surface 121 for accurate and precise cuts.

The cutting arm 130 is pivotally mounted to the base 110 and holds the saw blade 150 and the motor 140. The saw blade 150 rotated by the motor 140 cuts the workpiece put on the base and abutted against the fence 120 when the cutting arm 130 is pivoted toward the base 110.

With further reference to FIG. 2, the holding apparatus 160 in accordance with the prior art is used to fix the workpiece in position for being cut. The holding apparatus 160 is generally mounted on the base 110 for pressing the workpiece and includes a post 161, a transverse arm 162, a threaded rod 163 and a pressing disk 164. The post 161 stands on the base 100 and provides a plane 1611 at its upper portion. The upper portion of the post 161 passes through the transverse arm 162. The setscrew 1621 is screwed into the transverse arm 162 to press the plane 1611 to make the transverse arm 162 fastened.

The threaded rod 163 is screwed through the transverse arm 162 and perpendicular to transverse arm 162. The pressing disk 164 is attached to the lowest end of the threaded rod 163 to press and hold the workpiece 170 in position by rotating the threaded rod 163. Therefore, the miter saw 100 can accurately cut the workpiece 170 with the aid of the holding apparatus 160.

However, since the threaded rod 163 is not adjustable to substantially perpendicular to the operating surface 111 of the base 110, the holding apparatus 160 can be only used to press the workpiece with a top side substantially perpendicular to the standing surface 121 of the fence 120. If the top side of the workpiece is tilting, the holding apparatus 160 will become useless.

SUMMARY

An object of the present invention is to provide a holding apparatus for a power tool machine. The holding apparatus can press a workpiece with a horizontal or inclined top side when the workpiece is put on the power tool machine.

The power tool machine includes a base, a fence, a cutting arm, a motor, a saw blade and a holding apparatus. The base provides an operating surface on which the workpiece is put. The fence, which provides a standing surface substantially perpendicular to the operating surface for retaining one side of the workpiece, is mounted on the operating surface. The cutting arm is pivotally connected to the base. The motor is mounted to the cutting arm. The saw blade is mounted to the cutting arm and rotated by the motor to work at the workpiece.

The holding apparatus includes a supporting device, a connecting device, an adjustable device and a pressing device. The supporting device stands on the base and links up a body of the connecting device. The body of the connecting device is arranged substantially horizontal to the operating surface. The adjustable device is pivotally coupled to the connecting device. The pressing device is connected to the adjustable device for selectively pressing another side of the workpiece.

Since the connecting device is arranged substantially horizontal to the operating surface, and the adjustable device, relative to the connecting device, could be rotated, in the present invention the adjustable device could be moved to form an angle with or to be parallel with the connecting device. That makes the angle between the length direction of the pressing device and the operating surface changeable, so that the pressing device can press a workpiece with a horizontal or an inclined top. In addition, a positioning device is disposed to the connecting device and the adjustable device to make the user quickly, easily adjust the angle between the connecting device and the adjustable device.

BRIEF DESCRIPTION OF THE DRAWINGS

These and other features, aspects, and advantages of the present invention will become better understood with regard to the following description, appended claims, and accompanying drawings where:

DESCRIPTION OF THE PREFERRED EMBODIMENTS

Figure 1:
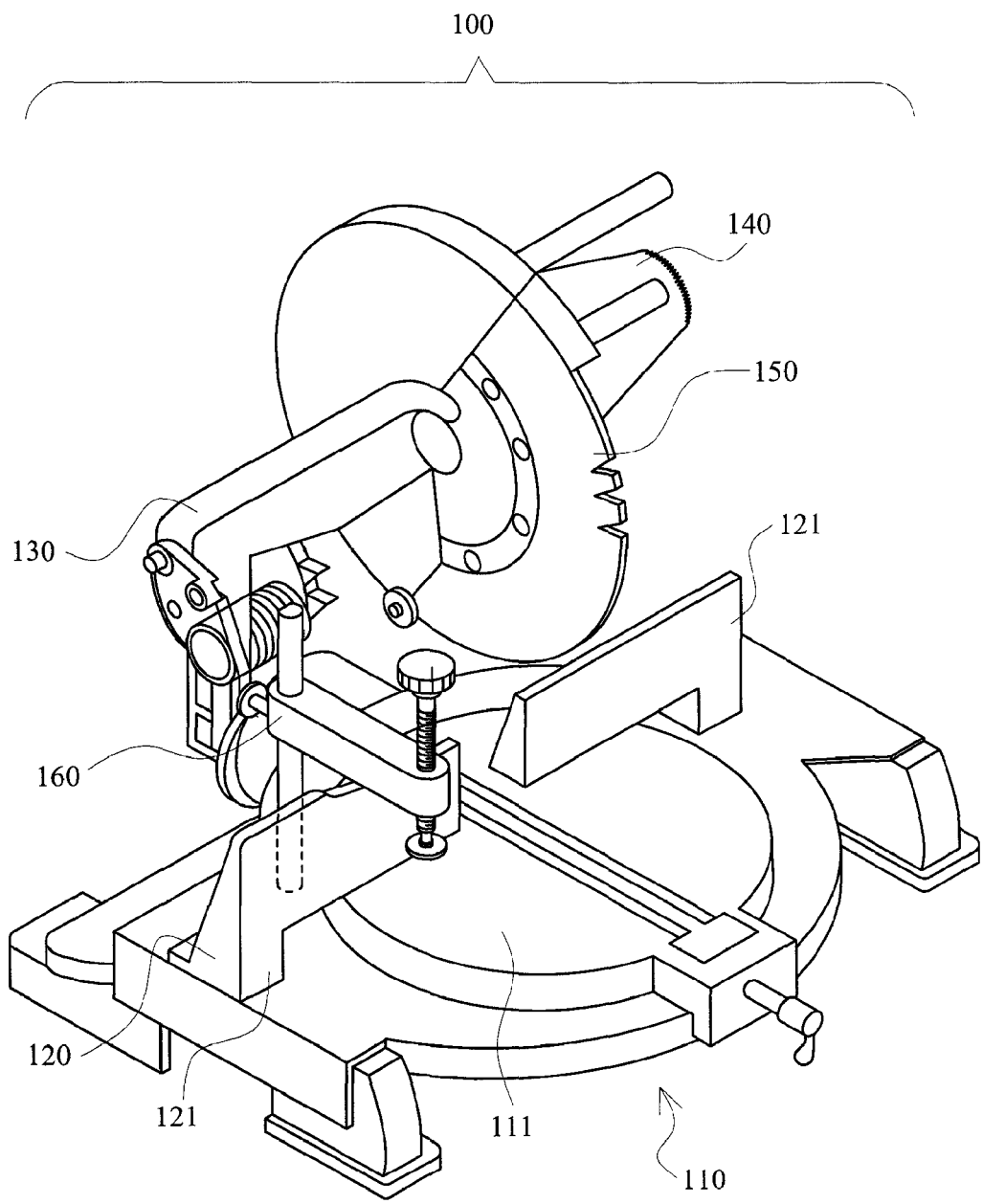
FIG. 1 is a perspective view of a power tool machine with a holding apparatus in accordance with prior art.
Figure 2:
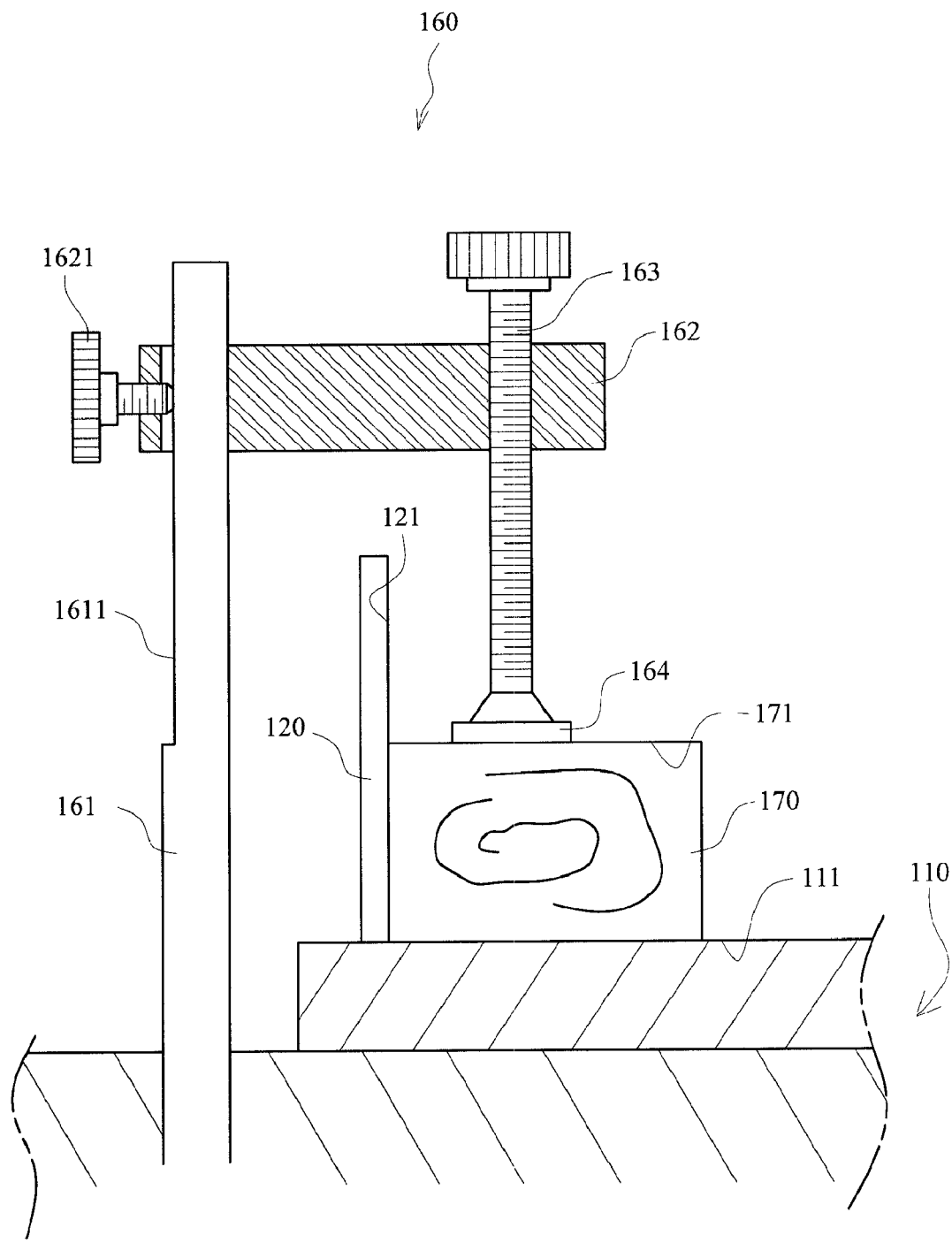
FIG. 2 is an enlarged operational, sectional view of the holding apparatus in FIG. 1.

Reference will now be made in detail to the embodiments of the present invention, examples of which are illustrated in the accompanying drawings. Wherever possible, the same reference numbers are used in the drawings and the description to refer to the same or like parts.

Figure 3:
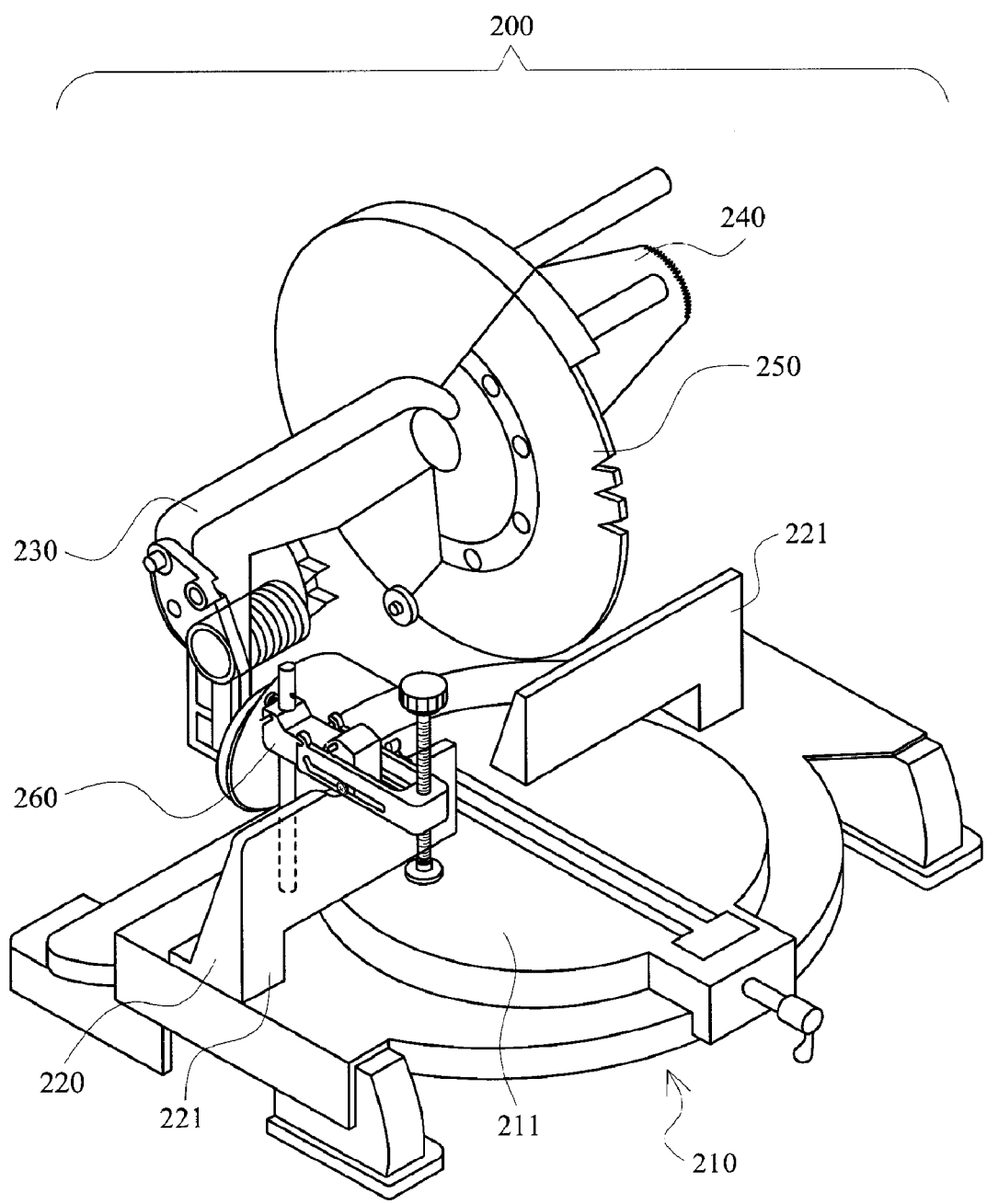
FIG. 3 is a perspective view of a power tool machine with a holding apparatus in accordance with present invention.

With reference to FIG. 3, a power tool machine 200 such as a miter saw in accordance with the present invention includes a base 210, a fence 220, a cutting arm 230, a motor 240, a saw blade 250 and a holding apparatus 260.

The base 210 provides an operating surface 211 or supporting a workpiece, and is generally categorized into two types, with turntable type and without turntable type. The base 210 shown in the FIG. 3 is a turntable type. The fence 220 is mounted on the base 210 and provides a standing surface 221 that is substantially perpendicular to the operating surface 211. A workpiece can be abutted against the standing surface 221 for accurate and precise cuts. An end portion of the cutting arm 230 is pivotally mounted to the base 210, and the other end portion holds the saw blade 250 and the motor 240. The motor 240 rotates the saw blade 250 to cut the workpiece abutted against the fence 220 when the cutting arm 230 is pivoted toward the base 210. The holding apparatus 260 is mounted to the base 210 and cooperates with the surfaces 211 and 221 to firmly secure the workpiece in position.

Figure 4:
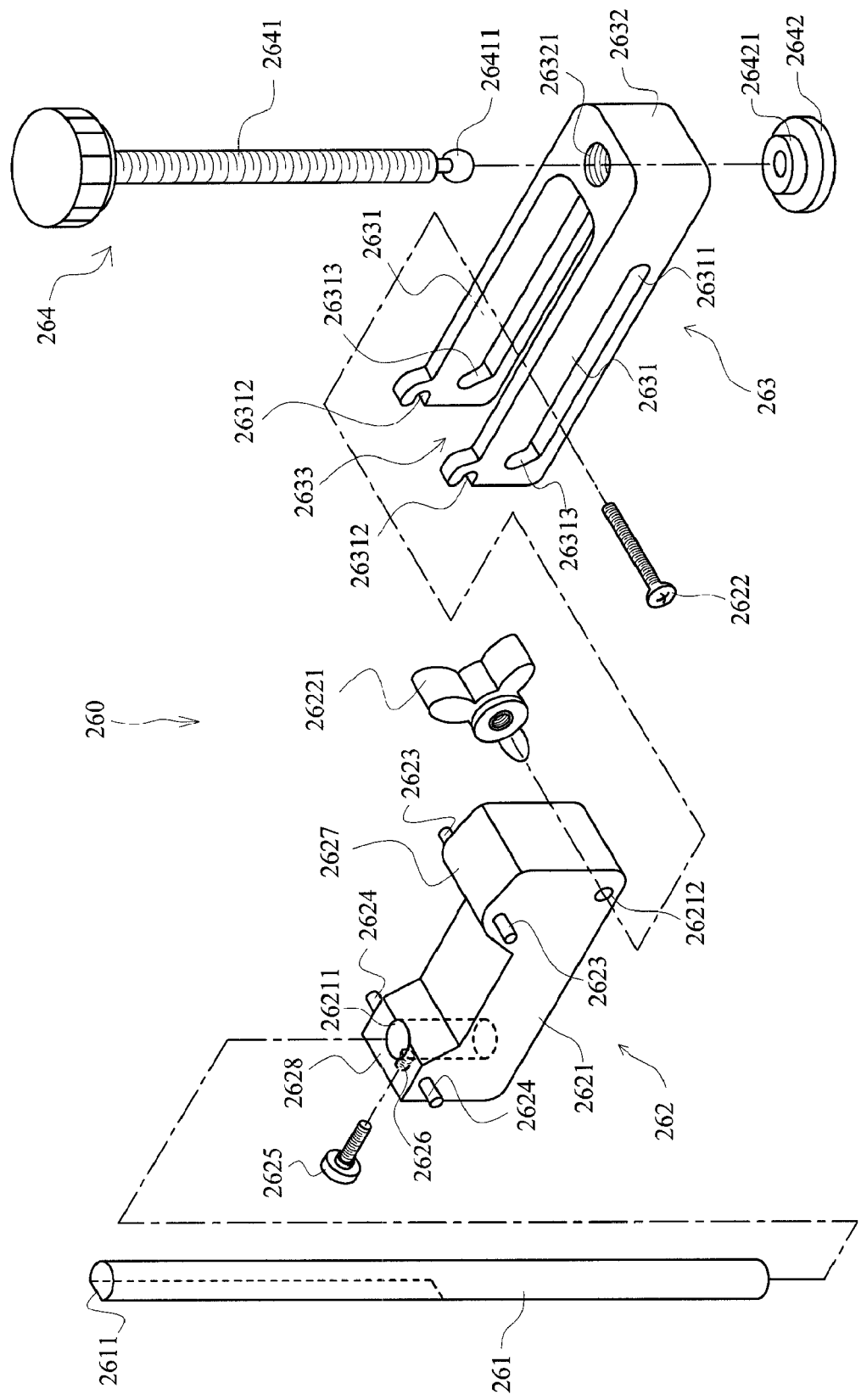
FIG. 4 is an exploded, perspective view of the holding apparatus in FIG. 3.
Figure 5:
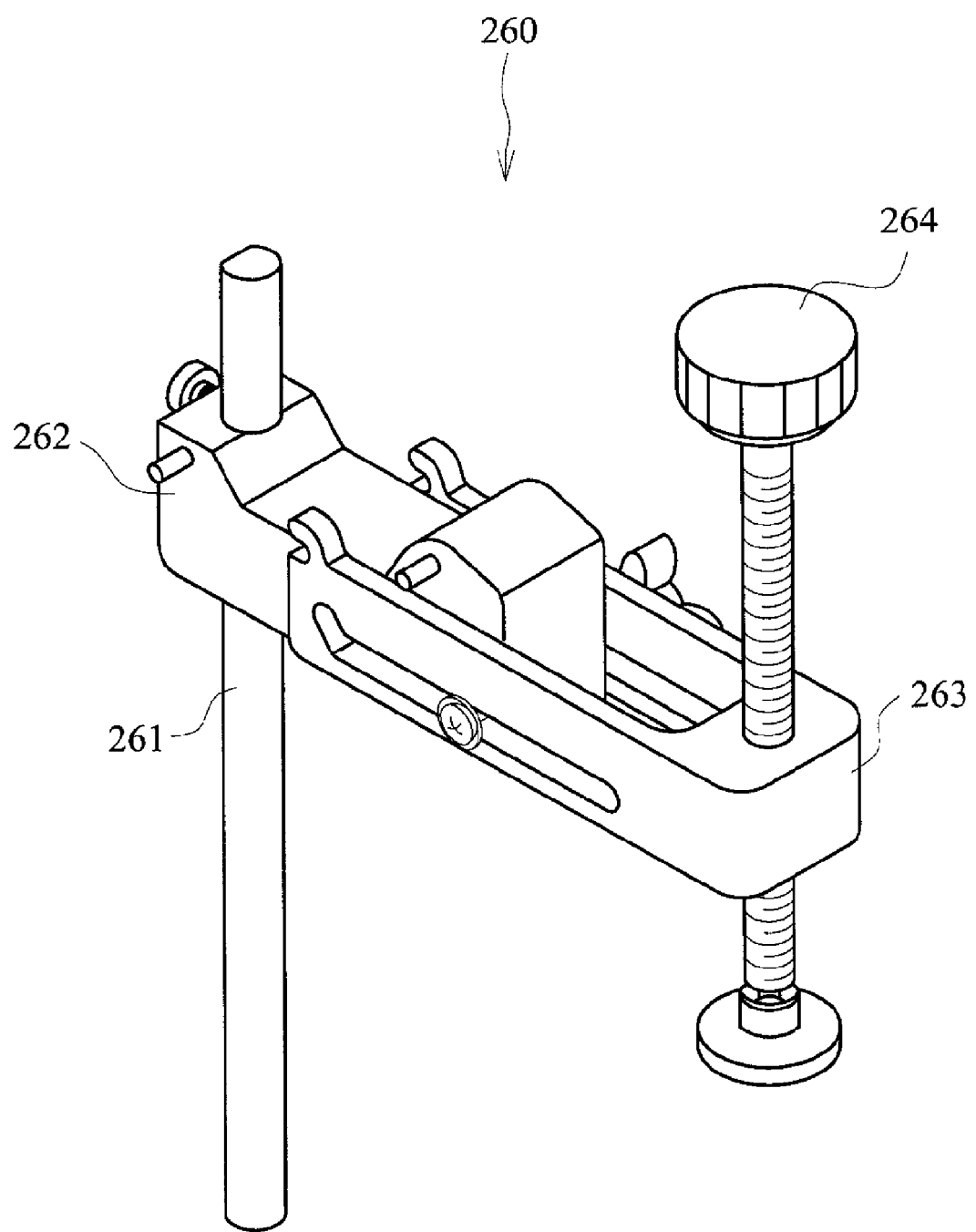
FIG. 5 is a perspective view of the holding apparatus in FIG. 3.

With reference to FIGS. 4 and 5, the holding apparatus 260 includes a supporting device 261, a connecting device 262, an adjustable device 263 and a pressing device 264.

The supporting device 261 is rod-shaped, inserted into the base 210, and provides a flat surface 2611 at its upper part.

The connecting device 262 is slidably mounted on the supporting device 261 and includes a body 2621, a bolt 2622, two first locking pins 2623, two second locking pins 2624 and a fixing member 2625. The body 2621 has a first end portion 2627, a second end portion 2628, a through hole 26211, a threaded hole 2626 and a guide pin hole 26212. The through hole 26211 passes through the second end portion 2628 of the body 2621. The supporting device 261 passes through the through hole 26211. The threaded hole 2626 is defined at the second end portion 2628, communicates with the through hole 26211 and is generally perpendicular to the through hole 26211 in their axial directions. The fixing member 2625 has a threaded shank that is screwed into the threaded hole 2626 to abut the flat surface 2611 for fastening the connecting device 262 on the supporting device 261 and preventing the connecting device 262 from swinging about the supporting device 261. To release the fixing member 2625 can make the connecting device 262 movable along the supporting device 261 so that user can adjust the height of the connecting device 262 up the operating surface 211. The first locking pins 2623 are mounted respectively, symmetrically on the sides of the first end portion 2627 of the body 2621, as two protrusions. The second locking pins 2624 are mounted respectively, symmetrically on the sides of the second end portion 2628 of the body 2621, as two protrusions. The guide pin hole 26212 is defined at the first end portion 2627.

Figure 6:
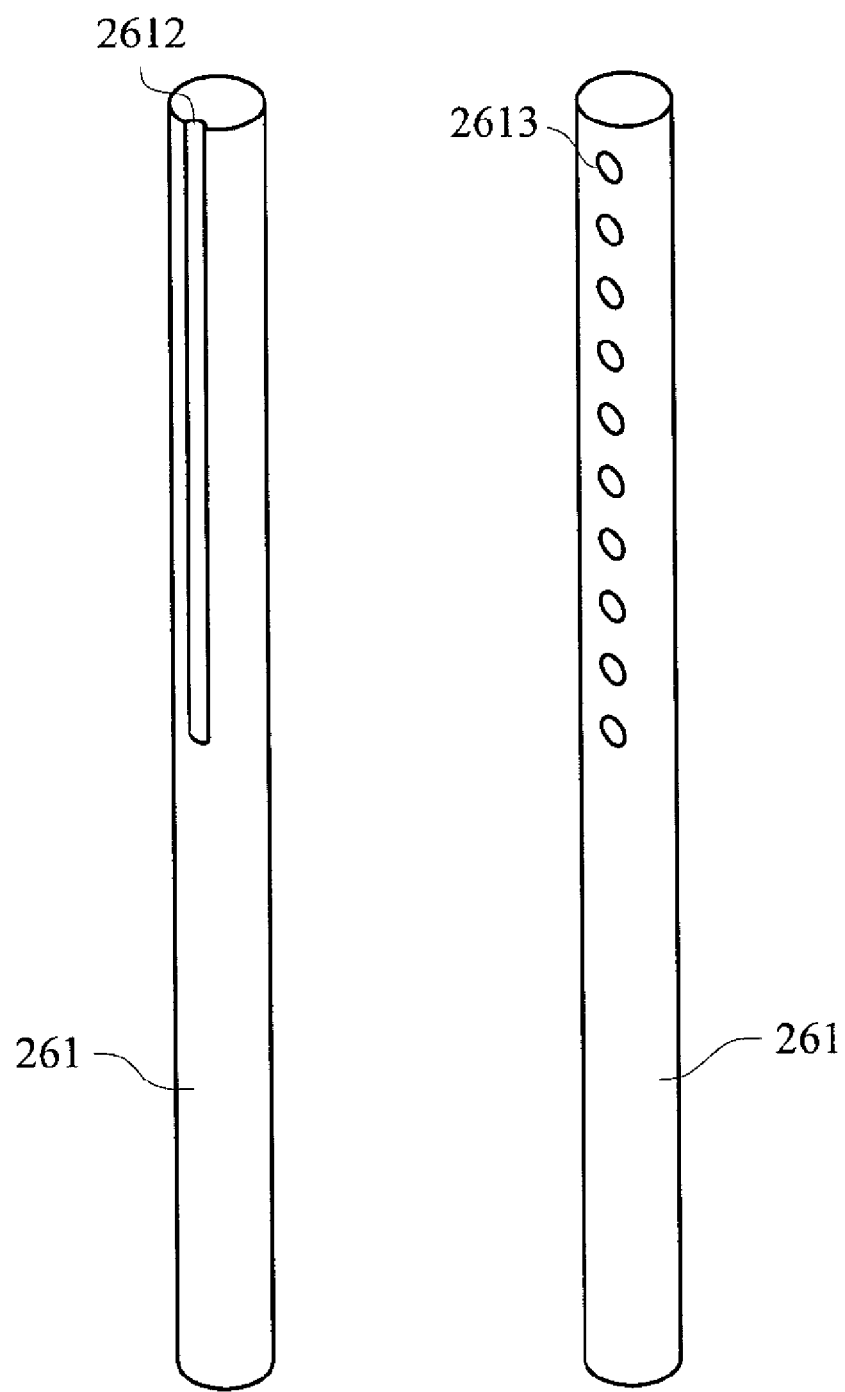
FIG. 6 is a perspective view of alternative embodiments of a supporting device of the holding apparatus in FIG. 4.

With further reference to FIG. 6, in alternative embodiments, substitutions of the flat surface 2611 of the supporting device 261 are implemented with a slot 2612 or multiple positioning holes 2613. The positioning holes 2613 can be through holes or blind holes and are arranged equidistantly. Therefore, it positions the connecting device 262 on the supporting device 261 by turning the fixing member 2625 through the threaded hole 2626 into the slot 2612 to press the inner wall of the slot 2612, or one of the positioning holes 2613.

With reference to FIGS. 4 and 5, the adjustable device 263 has two wings 2631 and a joint portion 2632. The wings 2631 extend respectively from the sides of the joint portion 2632, which form a gap 2633 between the wings 2631. The gap 2633 receives the body 2621. Each wing 2631 provides a guide slots 26311 and a locking notches 26312. The guide slot 26311 extends along the wing's length direction, but has a bent segment 26313 at its end. The locking notch 26312 is at the end of the wing 2631 and above the guide slot 26311. The guide pin 2622 has a head larger than the width of the guide slot 26311, and passes through the guide slot 26311, the guide pin hole 26212 and the other guide slot 26311 to be screwed into a nut 26221. The user can tighten the nut 26221 to fasten the adjustable device 263 on the connecting device 262 or release the nut 26221 to allow the adjustable device 263 slidable or pivotable, relative to the connecting device 262. The joint portion 2632 of the adjustable device 263 provides a threaded hole 26321 therethrough and generally perpendicular to its longitudinal axis.

The pressing device 264 includes a threaded rod 2641 and a pressing disk 2642. The threaded rod 2641 is turned into the threaded hole 26321 in the joint portion 2632 and has a ball joint 26411 at its terminal. When turning the threaded rod 2641, the length of the threaded rod 2641 down the threaded hole 26321 can be adjusted. The pressing disk 2642 has a ball seat 26421 accommodating and engaging unstably with the ball joint 26411. Therefore, the angle between the ball seat 26421 and the threaded rod 2641 can change in a limited range. The bottom of the pressing disk 2641 may be rough and elastic to protect the surface of the workpiece from damage.

Figure 7:
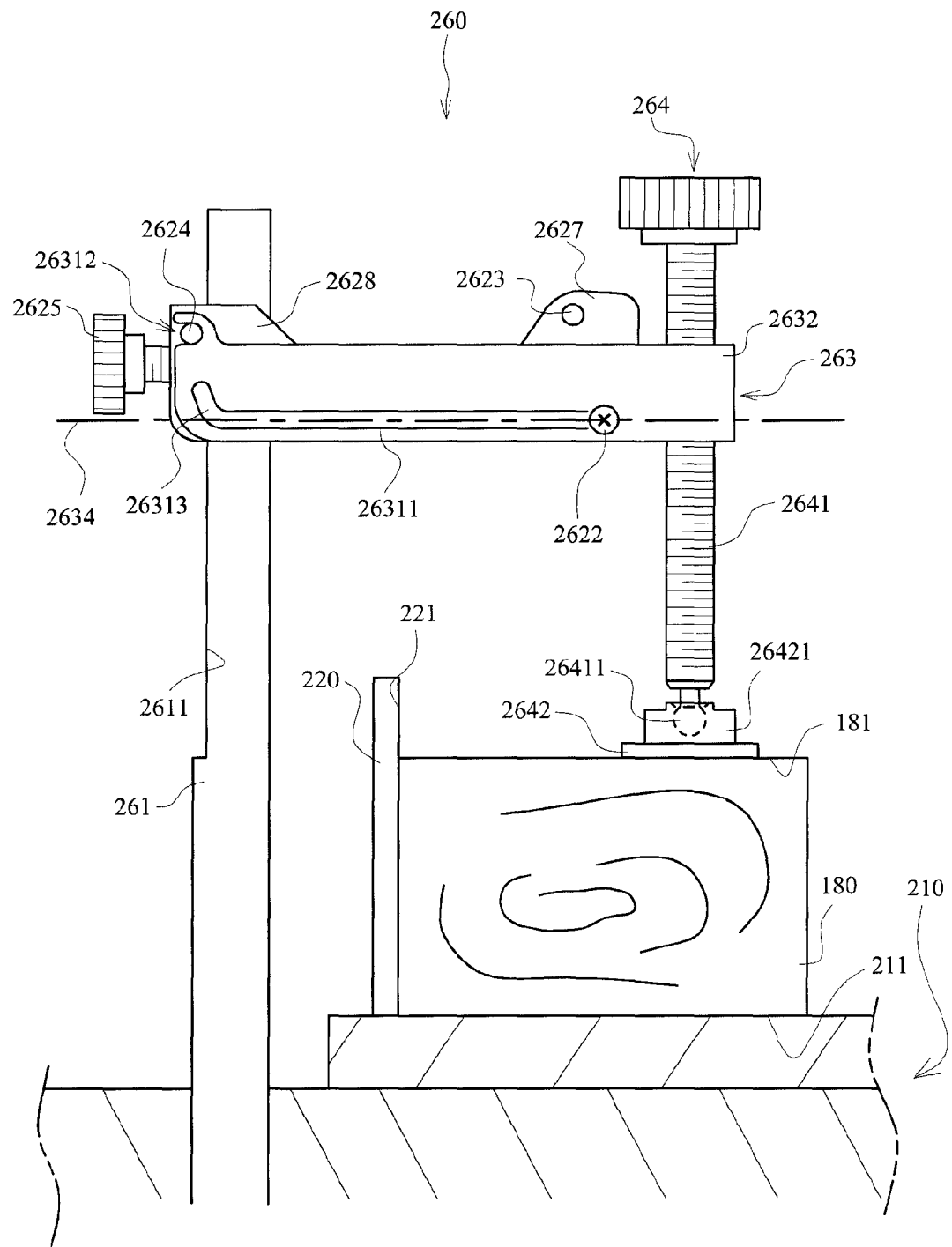
FIG. 7 is an enlarged, operational and sectional view of the holding apparatus in accordance with the present invention.

With reference to FIG. 7, the notches 26312 of the adjustable device 263 and the first locking pins 2623 and the second locking pins 2624 of the connecting device 262 of the holding apparatus 260 have positional relationships described as follows. The guide slot 26311 is substantially defined along an imaginary straight line 2634 that passes through the guide pin 2622. When the imaginary straight line 2634 is parallel to the operating surface 211, the perpendicular distance between the first locking pin 2623 and the imaginary straight line 2634 is larger than the perpendicular distance between the locking notch 26312 and the imaginary straight line 2634, but the perpendicular distance between the second locking pin 2624 and the imaginary straight line 2634 is equal to the perpendicular distance between the locking notch 26312 and the imaginary straight line 2634. Therefore, when the adjustable device 263 is slid by the guide slots 26311 until the locking notches 26312 engage with the second locking pins 2624 respectively, the length direction of adjustable device 263 is parallel to the operating surface 211, and the length direction of the pressing device 264 is perpendicular to the operating surface 211. After tightening the nut 26221 to fix the adjustable device 263 on the connecting device 262, turning the threaded rod 2641 will move the pressing disk 2642 to abut and press against the horizontal top surface 181 of a rectangular workpiece 180 perpendicular to the standing surface 221 for firmly holding the workpiece 180 in position.

Figure 8:
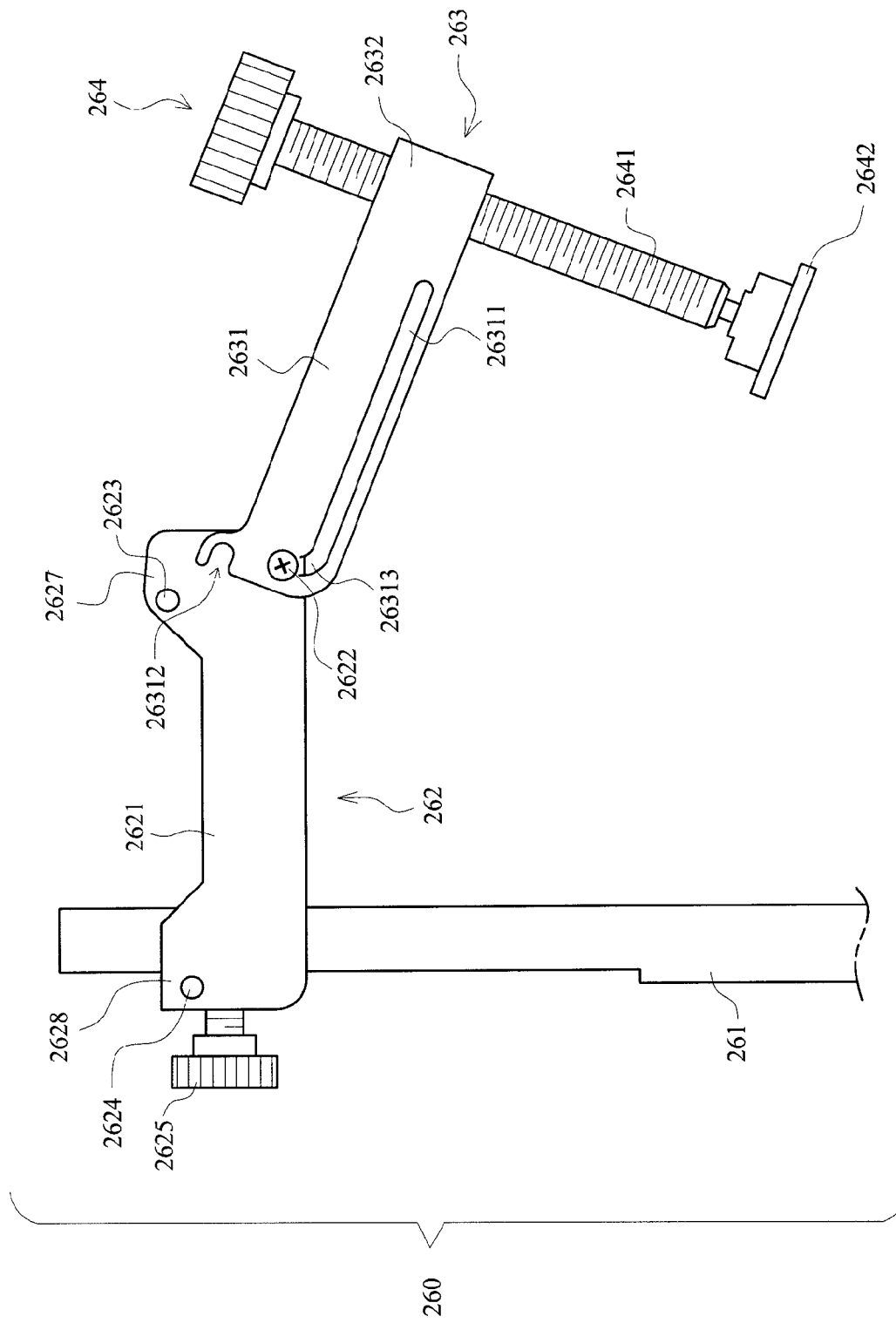
FIG. 8 is an enlarged, operational view of the holding apparatus in FIG. 7 when an adjustable device of the holding apparatus is slidably and pivotally adjusted.
Figure 9:
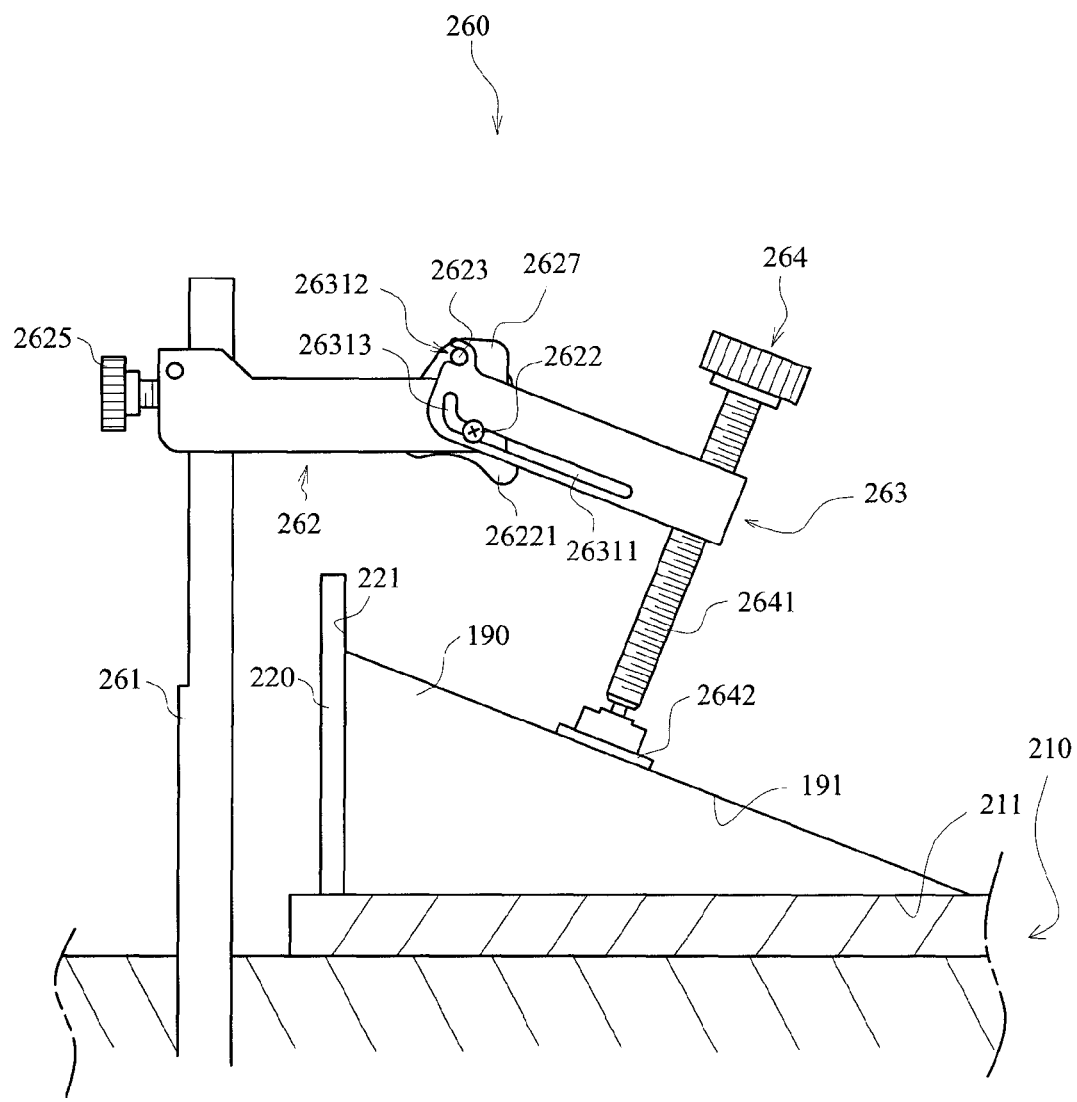
FIG. 9 is an enlarged, operational and sectional view of the holding apparatus in accordance with the present invention when the holding apparatus presses a workpiece with a triangular profile.

With reference to FIGS. 8 and 9, when the holding apparatus 260 is used to press a workpiece with an irregular profile, such as a triangular workpiece 190, the adjustable device 263 is slid levelly, forward 26311 by the guide slots, relative to the connecting device 262. When the guide pin 2622 gets into the bent segments 26313 of the guide slots 26311, the adjustable device 263 is guided to move down inclinedly to avoid the surrounding of the locking notches 26312 hitting the first locking pins 2623. The adjustable device 263 is pivoted about the guide pin 2622 downward and then pushed up inclinedly to make the locking notches 26312 engage with the first locking pins 2623 after the guide pin 2622 touches the terminal of the bent segments 26313. Further, tightening the nut 26221 will fix the adjustable device 263. Therefore, the length direction of the adjustable device 263 is accommodated for the inclined surface 191 of the triangular workpiece 190, and the length direction of the pressing device 264 is substantially perpendicular to the inclined surface 191. At the time, turning the threaded rod 2641 of the pressing device 264 can move the pressing disk 2642 toward the inclined surface 191 to abut against the inclined surface 191. The triangular workpiece 190 will be firmly held for accurate cuts.

The holding apparatus 260 interconnects the connecting device 262 and the adjustable device 263 to allow the adjustable device 263 sliding and pivoting, relative to the connecting device 262 by the guide slots 26311 and the guide pin 2622, and uses configuration of the guide pin 2622, the locking pins 2623 and 2624, the locking notches 26312 and the guide slots 26311 to fasten the adjustable device 263 on the connecting device 262. Therefore, the holding apparatus 260 provides the purpose of changing the angle between the length direction of the pressing device 264 and the operating surface 211 so that the pressing disk 2642 can press the horizontal top surface 181 of a rectangular workpiece 180 or the inclined surface 191 of the triangular workpiece 190. The holding apparatus 260 can help the power tool machine 200 accurately cut the workpiece that have rectangular or non-rectangular profile, or is placed in a tilted position. Moreover, the structure and the usage of the holding apparatus 260 are simple. Operation of the adjustable device 263 is quick and convenient.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A holding apparatus for a power tool machine, the power tool machine including a base providing an operating surface for supporting a workpiece, and a fence mounted on the operating surface and having a standing surface substantially perpendicular to the operating surface arrange to be abutted by a side of the workpiece, and the holding apparatus comprising:

a supporting device configured for mounting on the base of said power tool machine;

a connecting device comprising a body connected to the supporting device, wherein a length direction of the connecting device is substantially perpendicular to a length direction of the supporting device;

an adjustable device pivotally and slidably coupled to the connecting device, the adjustable device being slidable along the connecting device substantially in the length direction of the connecting device; and a pressing device connected to the adjustable device for selectively pressing another side of the workpiece;

wherein the adjustable device provides a guide slot, and the connecting device has a guide pin extending from the body of the connecting device through the guide slot; and wherein the connecting device further comprises a first projection protruding out of the body, the adjustable device provides a locking notch, the guide slot substantially elongates along a straight line passing through the guide pin, and the perpendicular distance between the first projection and the straight line is larger than the perpendicular distance between the locking notch and the straight line when the straight line is substantially perpendicular to the length direction of the supporting device.

2. The holding apparatus as claimed in claim 1, wherein the connecting device further comprises a second projection protruding out of the body, and the perpendicular distance between the second projection and the straight line is substantially equal to the perpendicular distance between the locking notch and the straight line when the straight line is substantially perpendicular to the length direction of the supporting device.

3. The holding apparatus as claimed in claim 1, wherein the guide pin and the first projection are mounted at an end of the body.

4. The holding apparatus as claimed in claim 1, wherein the pressing device comprises a threaded rod connected to the adjustable device.

5. The holding apparatus as claimed in claim 1, wherein the supporting device is a rod passing through the connecting device.

* * * * *